(12) United States Patent
Gerlinger et al.

(10) Patent No.: US 7,675,462 B2
(45) Date of Patent: Mar. 9, 2010

(54) METHOD AND SYSTEM FOR THE ALIGNMENT OF AN EARTH STATION ANTENNA WITH A SATELLITE ANTENNA

(75) Inventors: Leopold Gerlinger, Enzersfeld (AT); Erwin Greilinger, Vienna (AT); Christian Hausleitner, Vienna (AT)

(73) Assignee: Siemens AG Oesterreich, Vienna (AT)

( * ) Notice: Subject to any disclaimer, the term of this patent is extended or adjusted under 35 U.S.C. 154(b) by 225 days.

(21) Appl. No.: 11/884,061

(22) PCT Filed: Mar. 11, 2005

(86) PCT No.: PCT/EP2005/051119

§ 371 (c)(1), (2), (4) Date: Aug. 9, 2007

(87) PCT Pub. No.: WO2006/094558

PCT Pub. Date: Sep. 14, 2006

(65) Prior Publication Data

US 2008/0143600 A1    Jun. 19, 2008

(51) Int. Cl.
H04B 7/185 (2006.01)
H01Q 3/00 (2006.01)

(52) U.S. Cl. .................................................. 342/359
(58) Field of Classification Search .................. 342/359
See application file for complete search history.

(56) References Cited

U.S. PATENT DOCUMENTS

| | | | | |
|---|---|---|---|---|
| 4,688,250 | A * | 8/1987 | Corrington et al. | 713/170 |
| 4,860,352 | A * | 8/1989 | Laurance et al. | 380/258 |
| 5,589,837 | A * | 12/1996 | Soleimani et al. | 342/359 |
| 5,950,114 | A * | 9/1999 | Balachandran et al. | 340/7.2 |
| 6,268,826 | B1 | 7/2001 | Schmidt et al. | |
| 6,337,658 | B1 * | 1/2002 | Tong et al. | 342/359 |
| 6,707,425 | B2 * | 3/2004 | Louhi | 342/359 |
| 2003/0048222 | A1 | 3/2003 | Schmid et al. | |

FOREIGN PATENT DOCUMENTS

DE   10212625 A1   10/2003
EP   0361885 A1    4/1990

* cited by examiner

Primary Examiner—Gregory C Issing

(57) ABSTRACT

There is described a method for the alignment of an earth station antenna with a satellite antenna, wherein a reference signal, emitted by the earth station antenna is analyzed in a monitoring station, wherein the reference signal is used as a carrier for authentication information about the earth station.

19 Claims, 1 Drawing Sheet

METHOD AND SYSTEM FOR THE ALIGNMENT OF AN EARTH STATION ANTENNA WITH A SATELLITE ANTENNA

CROSS REFERENCE TO RELATED APPLICATIONS

This application is the US National Stage of International Application No. PCT/EP2005/051119, filed Mar. 11, 2005 and claims the benefit thereof. The International Application is incorporated by reference herein in it's entirety.

FIELD OF THE INVENTION

The invention relates to a method for the alignment of an earth station antenna with a satellite antenna and a system for putting into practice said method.

BACKGROUND OF THE INVENTION

In order to establish and maintain reliable and high quality two-way communication services via satellite and in order to avoid interference to an existing service caused by unauthorized and/or out-of-tolerance transmission, operators of earth station terminals are requested to perform a pre-transmission alignment (line-up) when accessing a satellite for the first time.

For this purpose, the initial line-up phase focuses on the effective isotropic radiated power EIRP, on frequency and antenna alignment, in order to ensure correct and interference free access to the satellite.

Thus, the antenna of an earth station terminal must both be pointed correctly at the antenna of the respective satellite and, in the case of linear polarization, it must also be oriented about its axis to maximize reception of the linearly polarized signal.

For this purpose, an antenna for linear polarized signals must be set up with particular care. In particular, if the setup is defective, the antenna transmits both with the required polarization and with the perpendicular polarization, which causes interference to other services. Consequently, standards generally require an earth station transmitting with linear polarization to satisfy a minimum polarization discrimination requirement.

In order to meet these requirements, one of the problems of installing low cost small earth station terminals is that for the initial antenna alignment and terminal configuration a service technician is required which needs to be trained to install bi-directional satellite communication systems. Consequently the deployment of a telecommunication system in which a geostationary satellite communicates with a plurality of ground stations consumes a lot of time and money (traveling costs, expenses, etc.).

Therefore it is an object of the invention, to simplify the line-up process in order to enable local distributors or even clients to get the satellite terminal operational by themselves (self install).

According to the invention, this object is realized with a method for the alignment of an earth station antenna with a satellite antenna, wherein a reference signal, emitted by the earth station antenna is analyzed in a monitoring station and the reference signal is used as a carrier for authentication information about the earth station terminal.

The present invention provides a simple solution for the need to send information about the earth station terminal. In praxis, a so called CW signal (Continuous Wave signal), that is to say, a sinus signal is used as reference signal. According to the invention, the information is modulated on this signal by on-off keying the CW signal. Mathematically this is a form of digital modulation of the signal. Because the on-off keying is done with a very slow bitrate (eg 2 bits/sec.), so the bandwidth of the modulated signal is very low. In order to underline, that very-low-rate modulation happens, the expression on-off keying will be used in the following preferably.

In order to increase the information rate the CW signal may be modulated with different levels of amplitude instead of applying pure on-off keying.

Preferred embodiments of the invention are described in the dependent claims.

The object of the invention is also realized with a System comprising:
- an earth station terminal with an antenna and with means for generating the modulated reference signal
- a Monitoring Station with means for the detection and identification of line-up requests and means for monitoring the co-polar and cross-polar components of the signal transmitted from the earth station.

BRIEF DESCRIPTION OF THE DRAWINGS

The following example, which is shown in FIG. 1, will illustrate a preferable embodiment of the invention

DETAILED DESCRIPTION OF INVENTION

Figure 1:
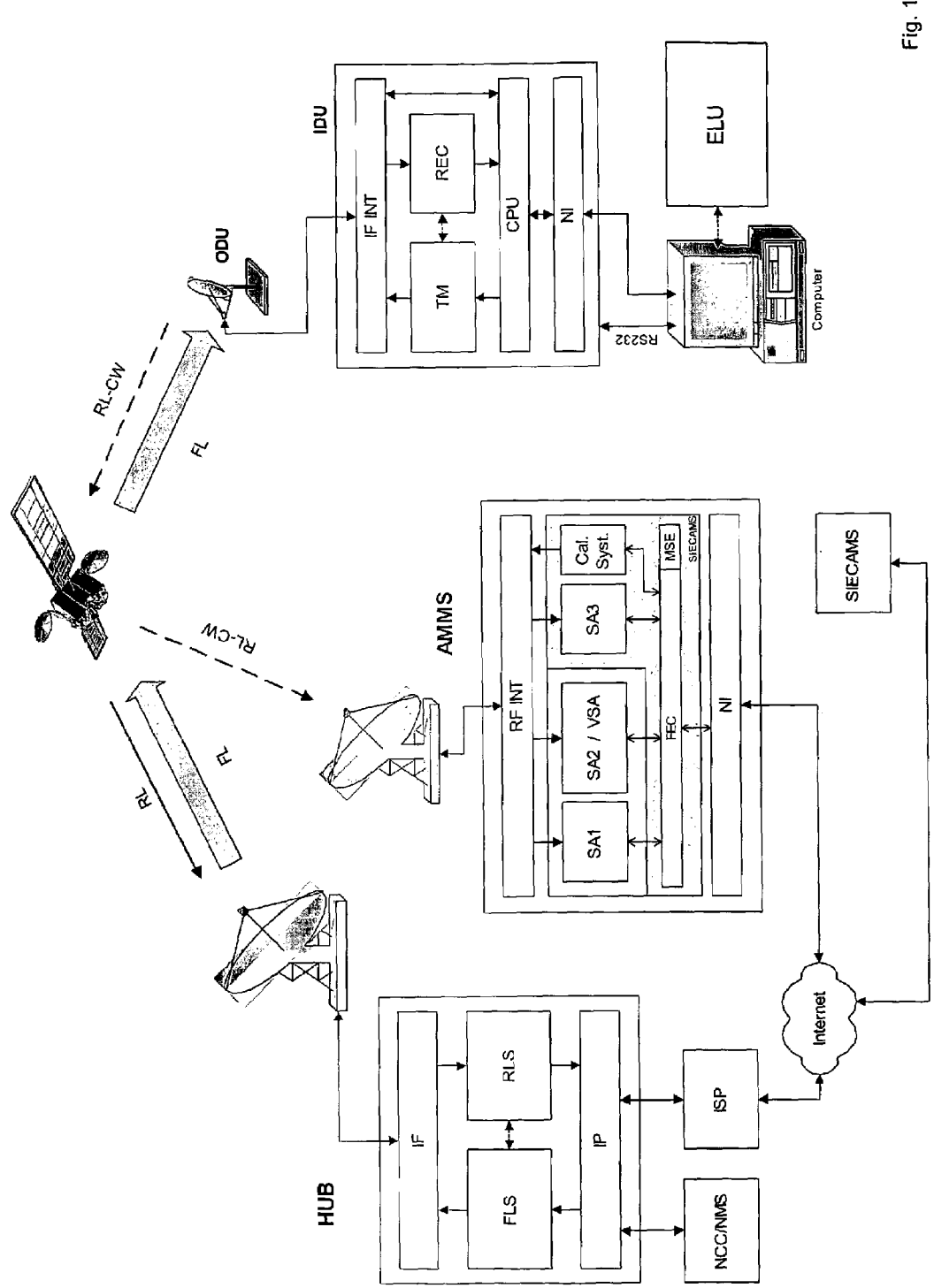
FIG. 1 shows exemplary a typical two-way satellite communication system.

The system according to FIG. 1 comprises a satellite, an earth station terminal comprising an indoor-unit IDU and an outdoor-unit ODU, a monitoring station AMMS, and a central earth station HUB.

The central earth station HUB is used for the connection of the satellite system to a communication network, for example the internet. For this purpose, the central earth station HUB comprises means IF, FLS, RLS for the communication via satellite to the earth station terminal IDU, ODU. As this communication is bidirectional, the expression "forward-link" will be used for the signals from the central earth station HUB to the earth station terminal IDU, ODU, while "return-link" will denote signals in the other direction.

A detailed description of a central earth station HUB and the other components of a typical satellite communication system can be found for example in ETSI TR 101 790, V 1.2.1 (2003-01) Digital Video Broadcasting (DVB); Interaction channel for Satellite Distribution Systems; Guidelines for the use of EN 301 790 and in corresponding ETSI recommendations.

One of the elements of such a system is the so called antenna misalignment monitoring station AMMS with interface components RF INT, NI, components for the measurement of antenna and transmission characteristics as the signal level and the co-polar and cross-polar components of the signal SA2/VSA, SA3, Cal. Syst., and a component SA1 for the detection and identification of Line Up requests of the earth station terminal IDU. The different tasks associated with SA1, SA2/VSA and SA3 may be implemented by a single device, depending on the performance and redundancy requested.

In the present example only one terminal IDU, ODU is shown, because it is sufficient for the understanding of the invention, whereas in real satellite systems, the number of terminals IDU, ODU is not limited.

In addition to the typical and well known components IF INT, TM, REC, CPU, NI, the earth station terminal includes a personal computer which is connected to the indoor-unit IDU. On this personal computer PC, a dedicated SW application ELU is installed, which guides the client through the installation, configuration and line-up process. Alternatively to the installation on a personal computer the dedicated SW application may be implemented as part of the IDU and, on the other hand, the IDU tasks itself may be implemented in terms of an extension module belonging to the PC (e.g. PCI card).

Precondition for this line-up process is the correct installation of the earth station terminal including the following steps:

mechanical installation of the terminal antenna;
mounting of the Out-Door-Unit (Transmitter, OMT, LNB);
cabling between ODU and IDU;
Satellite acquisition, that is to say, the axis of the antenna must be pointed correctly towards the relevant satellite and, in the case of linear polarization, its orientation about its axis must maximize the level of the received signal (at least up to a level which provides successful acquisition of the forward-link signal). This step is similar to the antenna alignment activity required for receiving direct to home (DTH) satellites (e.g. satellite television). The same equipment (test receiver, level meter, etc.) may be applied and optionally the customer could be advised with relevant help functionality provided by the SW application (e.g. installation and alignment tutorial, satellite channel allocation tables, transponder allocation tables, beacon frequencies, etc.).

After the preconditional steps have been done in an appropriate manner, the initial line-up and configuration procedure can be started.

As already noted, this procedure is supported by a SW application, running on a personal computer PC.

This SW-application may also provide relevant help functionality for supporting the customer with solutions for possibly appearing problems.

The following steps have to be done:

Selection of the Installed Terminal Equipment:

In order to enable the SW application to communicate with the indoor-unit of the terminal IDU in a correct manner, the customer needs to select the installed HW and relevant terminal capabilities (antenna model, transmitter model, LNB frequency shift, serial cable installed, etc.);

IP Configuration:

After the installation process, the terminal will act as a regular subscriber in the communication network, the Internet, to which the satellite system is connected by means of the Central earth station HUB. So the corresponding IP addresses, subnet masks and routing tables (e.g. derived from the terminal MAC address) have to be configured.

Configuration of the Relevant Forward Link Parameters:

For successful forward link acquisition the customer needs to configure the relevant receive parameters (e.g. frequency and symbol rate). Usually the service provider should give this information to the customer.

Optionally the terminal and/or SW application could be delivered in a preconfigured condition according the information from the service provider or the application could offer to perform a blind frequency scanning, which automatically tries to find forward link services for customer selection purpose.

In the case of successful forward link acquisition the application checks the receive level (e.g. SNR>7 dB) and if the terminal has successfully achieved the synchronization status;

In order to avoid any risk of interference with existing services, the default CW transmit frequency configuration should be regularly broadcasted via forward link to all terminals (e.g. via PID filtering). This enables the SW-application to automatically configure the correct frequency.

In case this service is not available or not supported, the CW transmit frequency parameter can be configured manually according the information from the service provider;

Configuration of GPS Coordinates

In order to enable the terminal to compensate for the difference in transmission times, depending on the geographical location of the terminal with respect to the satellite, it needs to be configured with its local GPS coordinates.

The SW application may provide some kind of graphical presentation for customer self-checking purpose (e.g. position indication in a map).

In case the GPS coordinates can not be provided by the customer, the system may support to configure the GPS coordinates in an automatic way at a later time with the help of the antenna misalignment monitoring station AMMS.

Terminal Authentication Via CW Signal On-Off Keying

After the configuration has been finished, the customer may initiate a line-up request. For this purpose, the terminal starts to transmit the relevant authentication information (e.g. MAC address, IP address, PID filter, installation ID, time slot information, etc.) according to the invention by on-off keying the CW Signal at the center frequency.

The terminal IDU, ODU may transmit a line-up request at any time what requires the antenna misalignment monitoring station AMMS to permanently scan the relevant frequency range to detect and decode the pulsed CW signal. In case of linear polarized signals the system simultaneously scans the co-polar and cross-polar component of the signal and takes the maximum for authentication purpose.

In order to support multiple, not synchronized, initial line-up requests the applied protocol shall be pure ALOHA. The application of this protocol maximizes the use of network resources, taking into account that the probability of an initial line-up request from a single terminal is usually low.

Consequently, pure ALOHA is a practical access method, as it results in a use of network resources in the order of 20%.

Assuming that the majority of terminals offer the capability to switch the CW signal on-off with a periodicity of half a second and assuming further that the relevant information for addressing the terminal via the forward link (terminal ID) does not exceed 100 Bits (including redundancy, coding and encryption) results in a maximum sustainable number of 14 terminals per hour (pure ALOHA).

Provided that not more than 14 terminals per hour are requesting for initial line-up support, this number of terminals can be successfully authenticated.

In order to increase the number of served terminals per hour the system will support random frequency divided multiple access. In this case the terminal transmits the pulsed CW signal at a random frequency channel adjacent to the default CW frequency.

As an example, the application will support 15 frequency channels to serve authentication of approximately 200 terminals per hour (provided that not more than 200 terminals per hour are requesting).

It is important to mention that the successful authentication of a requesting terminal enables the monitoring station to communicate with the terminal via the forward link. In the unlike situation that the terminal IDU, ODU does not support this unidirectional way of communication the local distributor shall temporarily install a receiver, which is supporting this service.

In case a terminal is not successfully identified after a certain amount of randomly delayed repetitions it will not receive an acknowledgement from the monitoring station (via the forward link) and consequently the terminal IDU, ODU will be disabled for transmission. This mechanism avoids the risk of generating permanent interference to existing services. The SW application will offer to unlock the terminal IDU, ODU via an activation code, which the customer may request from the service hotline, where also manual assistance is provided.

Alternatively, for authentication and communication purpose, the ALOHA principle may be applied in that way that the terminal transmits information (CW On-Off keying) which indicates a time slot when it accepts information broadcasted from the monitoring station via the forward link. In this case the relevant information (polarization discrimination, EIRP, IP address, routing information, GPS coordinates, HW-configuration, etc.) may be transmitted to the terminal by applying push data mechanisms (e.g. IP multicasting).

In case the requests for line-up are initiated from a small number of terminals and clients (e.g. installation teams) the terminal authentication process may be supported by allocating a dedicated frequency channel for each client (provided that no client initiates line-up requests from several terminals simultaneously).

Antenna Alignment Phase

After the requesting terminal IDU, ODU is identified, the monitoring station AMMS commands the terminal via the FW link to transmit a CW-signal at a dedicated frequency point, which is outside the 'pure ALOHA identification' frequency range.

The system takes care that a frequency channel is selected, which is not already occupied by an other terminal, which is currently in the alignment phase. This mechanism allows serving several terminals simultaneously with relevant antenna misalignment information, measured at the monitoring station AMMS and communicated via the forward-link F1. In case of linear polarized signals, the SW application provides the absolute polarization error in a graphical and acoustical way. Optionally, the system offers to indicate if the feed needs to be rotated clockwise or counterclockwise to achieve ideal polarization alignment.

In the present example, the component for the measurement of antenna and transmission characteristics SA2/VSA, is related to the amplitude measurements of the co-polar and cross-polar components for absolute polarization error calculation and provides the orientation information derived from the phase relationship measurements between the co-polar and cross-polar components.

For optimized antenna alignment, the customer needs to adjust the polarization angle in order to minimize the cross-polarization signal (nulling). This method is much more accurate than an adjustment based on maximizing the required polarization (co-polarization) because the gradient of the variation is known to be very steep. Simultaneously the SW application presents the relevant error information indicating when the adjustment of the orientation of the antenna is sufficiently accurate (i.e. the isolation exceeds a predetermined threshold).

In case this level of polarization discrimination cannot be achieved by optimizing the polarization alignment, the customer is asked to readjust the pointing of the antenna in terms of azimuth and elevation fine-tuning.

The alignment method described so far requires the existence of a cross-polar transponder in the same frequency range as the co-polar transponder. In case this frequency range is not within the planned regular service frequency range (e.g. at the start/stop frequency of the same or different transponders) the rotation error of the polarization angle may be taken into account by applying an appropriate model describing the atmospheric influence.

It should be mentioned that it is known, to measure the cross-polar signal at a different site. Therefore it is not absolutely necessary that co-polar and cross-polar signals are visible from the same monitoring station.

In case no cross-polar transponder is available, the antenna alignment may be performed in terms of maximizing the CW-signal. Alternatively the feed may be aligned to minimize the signal before it is rotated back by 90 degrees.

If it is not intended to deploy a cross-polar transponder consequently there is no risk to interfere with other services and the accuracy of the maximization method may be sufficient.

Serving e.g. the alignment of 200 terminals per hour, which may occupy e.g. 100 frequency channels, means that each of the 200 customers has half an hour time to finish the antenna alignment with the required level of accuracy. In case this time frame is to short for the customer he is asked to request for an extension, what again is communicated to the monitoring station via CW on-off keying (via the SW application).

In case correct antenna alignment cannot be obtained at all, it is preferable for the customer to be advised of this situation and that the terminal is automatically prohibited to transmit in order to avoid any risk of interference to existing services.

After successful antenna alignment and correct EIRP and GPS coordinates configuration, the customer may initiate the regular terminal logon procedure (signaling, acquisition, synchronization) for establishing the two-way communication link.

Optional EIRP Adjustment

When the terminal does not support automatic power control mechanism (e.g. via control communication between ODU and IDU), an automatic EIRP adjustment process should be started.

This step may be performed following the antenna alignment phase.

In the first instance, the terminal communicates the relevant HW configuration to the monitoring station, again via CW on-off keying.

In order to determine the terminal's transmission curve and saturation point it changes the transmitted power according the forward link FL commanding while the monitoring station measures the terminal's uplink EIRP.

After measuring the transmission curve, the monitoring station commands the terminal (via the forward link FL) to set the EIRP level accordingly. Therefore the monitoring station takes into account the terminal, transponder and hub saturation limits.

Optional Configuration of GPS Coordinates

In case the GPS coordinates cannot be provided by the customer during the configuration phase, they may be automatically configured following the antenna alignment or EIRP adjustment phase.

For this purpose, either the monitoring station AMMS has access to a transmitter location system (TLS) or the postal address (zip code, city, street, street number) of the place where the terminal is located has to be communicated via on-off keying of the Cw signal to the monitoring station AMMS, where the system performs an automatic lookup in a database to find out the GPS coordinates according to the postal address. The database may be provided by a standard GPS navigation system.

After the monitoring station AMMS has determined the GPS coordinates, they are communicated to the terminal via the forward link.

In case the customer has already entered into a contract with the service provider an other option may be considered, where the monitoring station first ask the service provider's database for the relevant address information.

In that case the customer is only asked if this address corresponds with the place where the terminal is installed. For verification purpose the SW application will provide a graphical presentation of the installation place by indicating the position in a map image.

Optional Configuration of Authorization And User Profile Data

In case the customer has not already entered into a contract with the service provider, depending on the sales strategy, the system may offer a trial period.

For this purpose, the monitoring station will support automatic configuration of the relevant authentication and authorization data in the hub's database (e.g. user profile, IP addressing, etc.). Information that is not available at the monitoring station but required to successfully complete this task will be communicated from the terminal to the monitoring station via CW on-off keying.

In addition, the SW application will provide information where to find the registration service (e.g. website) for enabling the customer to enter into a contract with the service provider after the trial period.

In case the customer has already entered into a contract but service provider and/or the NCC do not, or not fully support the terminal registration in advance (e.g. IP addressing, IP multicasting, etc.), this task may also be supported by the automatic configuration functionality.

Performance

According to the present example, the system supports initial line-up requests from 200 terminals per hour. For this purpose, it is necessary to provide 15 permanent channels for authentication and 100 permanent channels for antenna alignment purpose.

The terminal maximum frequency error according ETSI TR 101 790, V 1.2.1 (2003-01) is +/−765 Hz @ 12.75 GHz. In order to avoid interference due to less frequency distance a channel spacing of min. 2 kHz shall be applied what results in a co-polar and cross-polar frequency occupation of 230 kHz.

First trial measurements indicate that the polarization discrimination can be measured up to 35 dB with a RBW setting of 300 Hz.

Continuous Antenna Alignment Monitoring

In order to support continuous antenna alignment monitoring to detect possible failures and to avoid interference to existing services in advance the system periodically (e.g. once per day) asks the terminals via the FW link communication to transmit a CW signal at a predefined power level and frequency for a predefined time frame.

This enables the antenna misalignment monitoring station to measure the level of polarization discrimination. In case the discrimination falls below a predefined threshold the customer will be asked to repeat the antenna alignment procedure (step 0) within a certain time frame.

In case the polarization discrimination does not meet the standard of the service and/or satellite provider the terminal automatically will be disabled for transmission and the customer needs to perform again the steps described in section 0 or may call the service hotline for manual support.

Operator Initiated Measurements

In order to offer manual assistance during the terminal authentication, antenna alignment and EIRP adjustment phase the system provides remote access to a spectrum analyzer (SA3) in the antenna misalignment monitoring station AMMS.

Furthermore this functionality offers to identify and clarify possible earth station anomalies as:

IDU and/or ODU anomalies (e.g. frequency instabilities);

Sub-system saturation problems;

Interference checks;

EIRP measurements;

Center frequency measurements; and antenna misalignment measurements.

The invention claimed is:

1. A method for an alignment of an earth station antenna with a satellite antenna of a satellite, comprising:
   initiating an alignment request for an earth station by emitting a reference signal at a predetermined identification frequency range by an antenna of the earth station to a satellite antenna of a satellite;
   scanning the identification frequency range by an antenna misalignment monitoring station (AMMS) in communication with the satellite to detect and decode the reference signal, wherein the reference signal is used as a carrier for authentication information about the earth station;
   authenticating the earth station to enable communication between the AMMS and the earth station via the satellite through a forward link;
   after authentication, commanding the earth station by the AMMS via the forward link to transmit the reference signal at a dedicated frequency outside the identification frequency range for communicating antenna misalignment information; and
   receiving by earth station from the AMMS antenna misalignment information for alignment of the earth station antenna with the satellite antenna.

2. The method according to claim 1, wherein the reference signal is detected and analyzed in a monitoring station in accordance with a random frequency divided multiple access protocol.

3. The method according to claim 1, wherein the transmission of information is based on a digital modulation of the reference signal.

4. The method according to claim 2, wherein the transmission of information is based on a digital modulation of the reference signal.

5. The method according to claim 1, wherein the authentication information comprises an address selected from the group consisting of a MAC Address, a IP-Address, and a combination thereof.

6. The method according to claim 1, wherein the authentication information comprises a PID-Filter information.

7. The method according to claim 1, wherein the authentication information comprises an installation ID.

8. The method according to claim 1, wherein the authentication information comprises a Time Slot Information.

9. A system to align a earth station antenna with a satellite antenna, comprising:

an earth station terminal with an antenna and a generator for a modulated reference signal, wherein the earth station initiates an alignment request by emitting the modulated reference signal at a predetermined identification frequency range by the antenna of the earth station to a satellite antenna of a satellite; and an antenna misalignment monitoring station (AMMS) in communication with the satellite to detect alignment requests by scanning the identification frequency range by the AMMS to decode the modulated reference signal, wherein the reference signal is used as a carrier for authentication information about the earth station, to authenticate alignment requests and command the earth station to thereafter transmit the reference signal at a dedicated frequency outside the identification frequency range for communicating antenna misalignment information, to measure a antenna characteristic and a transmission characteristic based upon the reference signal transmitted from the earth station terminal to the satellite, and to monitor the antenna characteristic and the transmission characteristic, and to transmit to the earth station misalignment information for alignment of the earth station antenna with the satellite antenna.

10. A method for an alignment of an earth station for a communication link between the earth station and a satellite, comprising:

initiating an alignment request for an earth station by emitting a reference signal at a predetermined frequency range in accordance with a random frequency divided multiple access protocol by an antenna of the earth station to an antenna of a satellite;

sending authentication information to the satellite via the reference signal; scanning the identification frequency range by an antenna misalignment monitoring station (AMMS) in communication with the satellite in accordance with the random frequency divided multiple access protocol to detect and decode the reference signal;

analyzing the reference signal by the AMMS to authenticate the earth station to enable communication between the AMMS and the earth station via a forward link;

after authentication, commanding the earth station by the AMMS via the forward link to transmit the reference signal at a dedicated frequency outside the identification frequency range for communicating antenna misalignment information; and receiving by earth station from the AMMS antenna misalignment information for alignment of the earth station antenna with the satellite antenna.

11. The method according to claim 10, wherein the authentication information comprises an address selected from the group consisting of a MAC-Address, a IP-Address, and a combination thereof.

12. The method according to claim 10, wherein the authentication information comprises a PID-Filter information.

13. The method according to claim 10, wherein the authentication information comprises an installation ID.

14. The method according to claim 10, wherein the authentication information comprises a Time Slot Information.

15. The method according to claim 10, wherein the monitoring device is a monitoring station.

16. The method according to claim 15, wherein the transmission of information is based on digital modulation of the reference signal.

17. The method according to claim 16, wherein the reference signal is a continuous wave signal.

18. The method according to claim 17, wherein the authentication information is modulated on the reference signal based upon a on-off keying.

19. The method according to claim 18, wherein the modulation is based on different amplitude levels.

* * * * *